B. STASZKO.
SNOW PLOW.
APPLICATION FILED MAR. 23, 1918.

1,269,016.

Patented June 11, 1918.

Inventor:
Bazyli Staszko.
by Oscar Geier
Attorney.

UNITED STATES PATENT OFFICE.

BAZYLI STASZKO, OF HATFIELD, MASSACHUSETTS.

SNOW-PLOW.

1,269,016.

Specification of Letters Patent.

Patented June 11, 1918.

Application filed March 23, 1918. Serial No. 224,296.

*To all whom it may concern:*

Be it known that I, BAZYLI STASZKO, a subject of the Emperor of Austria, resident of Hatfield, county of Hampshire, and State of Massachusetts, have invented certain new and useful Improvements in Snow-Plows, of which the following is a specification.

This invention relates to improvements in attachments to vehicles whereby snow and the like may be cleared from the path of travel.

The principal object of the invention is to provide an attachment which may be readily engaged or disengaged from a vehicle, particularly of the automobile type, and provided with rigid running boards, without material change in the vehicle or the parts thereof.

These and other like objects are attained by the novel construction and combination of parts hereinafter described and shown in the accompanying drawings, forming a material part of this disclosure, and in which:—

Figure 1:
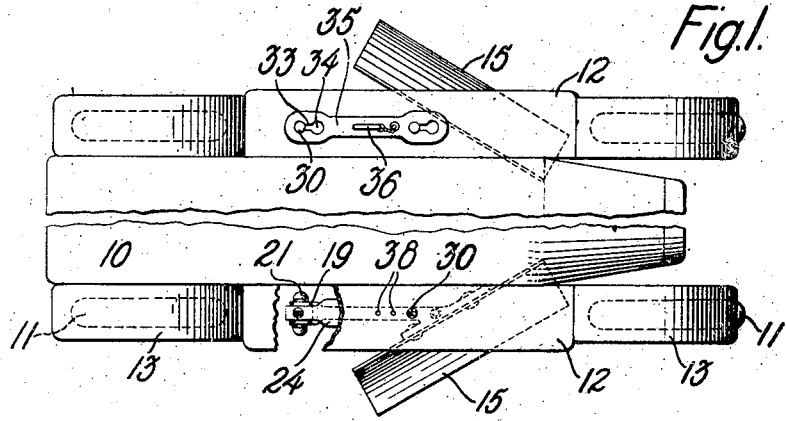
Figure 1 is a fragmentary top plan view of a conventional type of automobile, indicating the application of the invention.
Figure 2:
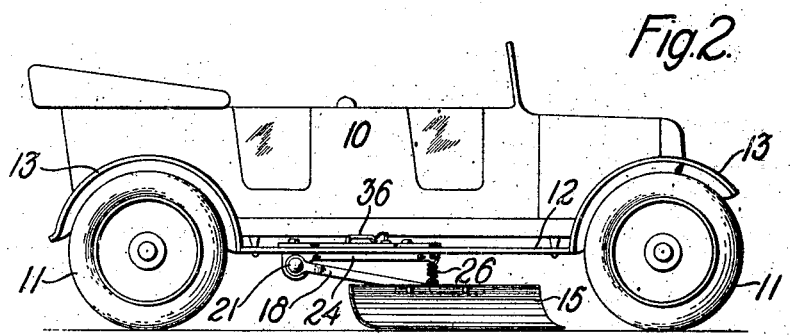
Fig. 2 is a side elevational view of the same.
Figure 3:
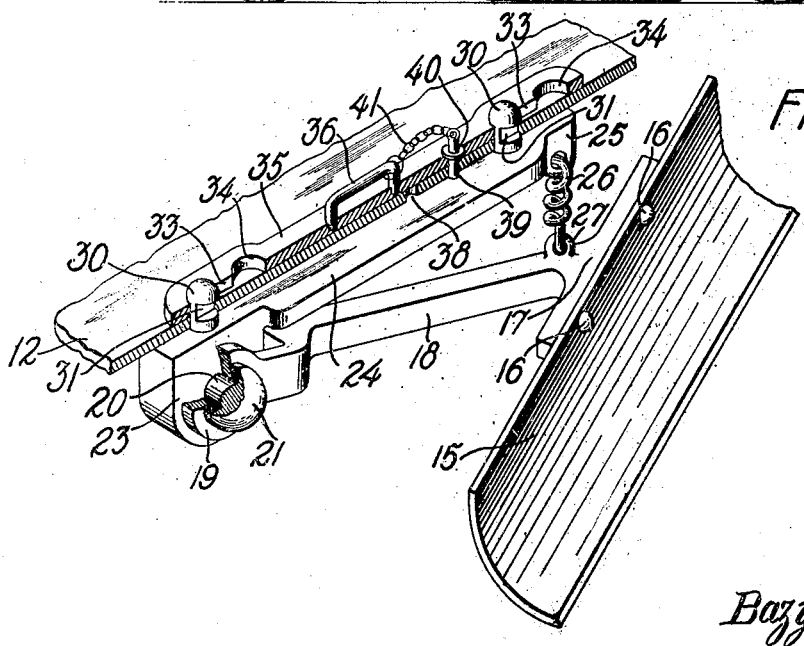
Fig. 3 is a fragmentary perspective view of the attachment, indicating the manner in which it is applied to a vehicle, parts being broken away in order to disclose the construction.

The numeral 10, designates the body of an automobile and 11 the wheels thereof, the same being of the ordinary type of construction, as is the running boards 12 at the sides of the vehicle, adjoining the mud guards 13.

The snow plow attachments, two of which are used, one upon each side of the vehicle, are composed of curved rigid shear plates 15, arranged diagonally with respect to the center line of the vehicle, the lower edges extending outwardly substantially level with the road over which the vehicle passes.

These shear plates have rigidly secured to them bars 17, formed with and extending angularly from lever arms 18, forked at their opposite ends, the arms 19 of the forks, being hingedly engaged by pins 20, with the extending heads 21, formed with depending lugs 23, of brackets 24, having a level upper surface adapted to be tightly engaged with the lower side of the running board 12, the extreme front end of the bracket plates 24, terminating in narrow projections 25.

The eyes of tension springs 26, engage in the lugs 25 and have their lower bent ends engaged in corresponding eyes 27, formed with the outer ends of the lever arms 18.

Formed through the running boards are two round openings receptive of the heads 30 of studs rigidly engaged in the fixed brackets 24, the studs having recesses 31, formed upon opposite sides, the same being of considerable magnitude and fitted to engage within slots 33 extending from circular openings 34, formed in sliding plates 35, mounted on the upper surface of the running boards and provided with operating handles 36, by means of which they may be conveniently operated.

In order to hold the brackets 24 and the lugs 25, in rigid relation with the running boards 18, there are formed through the running boards a pair of spaced circular openings 38, engageable with which are pins 39 provided with collars 40, adapted to rest upon the surfaces of the lock plates 35, when engaged with either of the openings 38, and is prevented against loss by chains 41 or the like.

In operation, when it is desired to attach the snow plow, the brackets 24 are disposed below the running boards so as to permit the studs 30, to be passed upwardly therethrough, whereupon they are engaged with the openings 34 in the lock plates 35, the plates drawn length-wise so as to cause the slots 33 to engage with the recesses 31, of the studs and the pins 39 dropped into position, through one of the openings 38 in the running boards, thus locking the brackets against movement.

When it is desired to disengage the snow plow, the pins 39 are raised, the lock plates 35 moved length-wise to permit the studs 30 to pass through the openings 34, completely releasing the brackets so that they may be stored in any convenient place for further use.

From the foregoing, taken into connection with the drawings, a full disclosure of the invention has been made and it will be obvious that the attachments can be readily applied and efficiently used at any desired time.

Having thus described my invention, what I claim as new and desire to secure by Letters Patent, is.

1. In a snow plow, the combination with a vehicle having lateral running boards, of a pair of diagonally disposed curved shear plates, levers rigidly engaged with said plates, brackets upon which said levers are pivotally supported at one end, resilient supports at the opposite ends of said levers, and means for engaging or disengaging said brackets from the running boards of said vehicle.

2. In a snow plow attachment for vehicles, the combination with a vehicle having running boards extending longitudinally at both sides thereof, of brackets fitted against the lower side of said running boards, studs extending upward through said brackets, said studs having oppositely disposed transverse slots formed therethrough, sliding plates having openings receptive of the heads of said studs, and slots extending between the openings adapted to engage with the slots in said studs, means for holding said sliding plates in an engaged position, levers pivoted in said brackets, angular bars formed with said levers, shear plates secured to said angularly disposed bars, and flexible connections between said bars and said brackets whereby said plates are held resiliently suspended.

In testimony whereof, I have affixed my signature.

BAZYLI STASZKO.